March 4, 1969 P. H. WENDT 3,430,989
PIPE COUPLING
Filed Dec. 20, 1967 Sheet 1 of 2

INVENTOR
PAUL H. WENDT
BY
Lyon & Lyon
ATTORNEYS

March 4, 1969     P. H. WENDT     3,430,989
PIPE COUPLING
Filed Dec. 20, 1967     Sheet 2 of 2
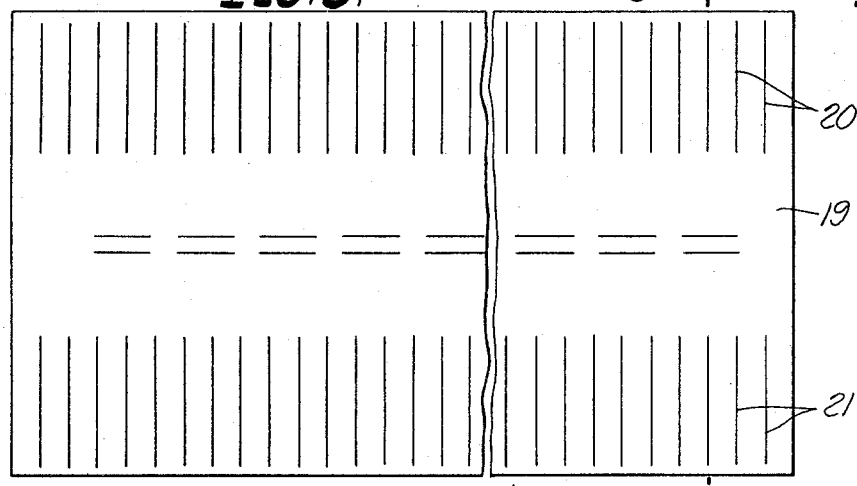
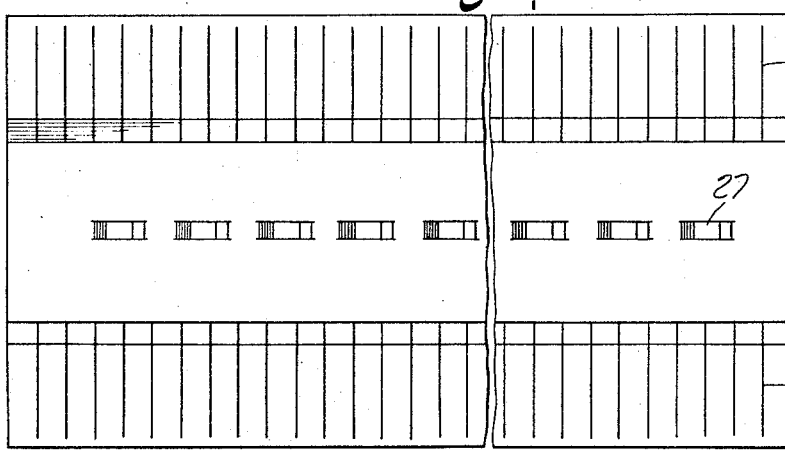
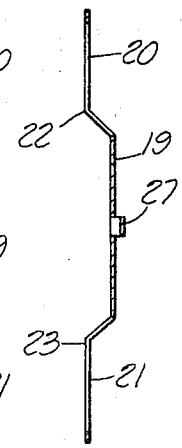
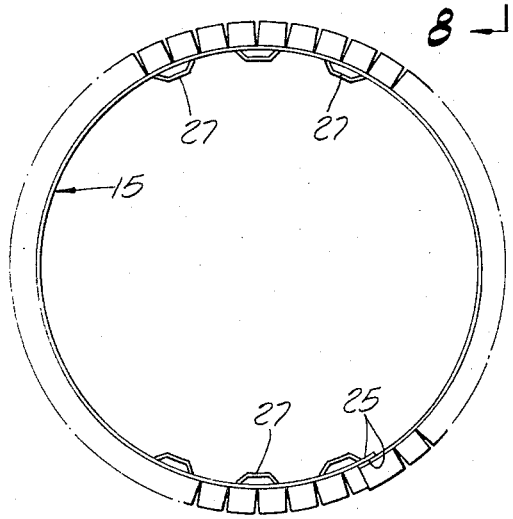
INVENTOR
PAUL H. WENDT
BY
Lyon & Lyon
ATTORNEYS United States Patent Office 3,430,989
Patented Mar. 4, 1969

3,430,989
PIPE COUPLING
Paul H. Wendt, Arcadia, Calif., assignor to Pacific Clay Products, Los Angeles, Calif., a corporation of California
Continuation-in-part of application Ser. No. 642,757, June 1, 1967. This application Dec. 20, 1967, Ser. No. 692,071
U.S. Cl. 285—110                             6 Claims
Int. Cl. F16l 21/00, 49/00

ABSTRACT OF THE DISCLOSURE

A coupling for connecting pipe ends which may vary in diameter and roundness has a tubular body formed of elastomeric material which has spaced internal deformable lips for contact with the outside surface of ceramic pipe ends, and the body is encircled by a spring steel shell. The shell has two series of axially extending slits encircling the deformable lips, so that the slit portions of the metal shell may expand radially to accommodate deformation of the sealing lips when pipe ends are inserted into the body, and so that the portion of the metal shell between the slit portions may resist shear loads between the pipe ends.

---

This is a continuation-in-part of my copending application for Pipe Coupling, Ser. No. 642,757, filed June 1, 1967 and now abandoned.

This invention relates to couplings for connecting ceramic pipe lengths end to end, and may be classified as a pipe joint or coupling. Devices of this general type are shown in United States Patents Beecher 2,167,865, Evans 3,233,922, and Heflin 3,249,685. However, these prior art patents do not show coupling devices capable of accommodating variations in roundness and diameter which occur in commercial cast iron, ceramic, or other pipe, and without the use of clampings or other mechanically actuated locking devices.

Briefly stated, this invention concerns a coupling for connecting cast iron or ceramic or other pipes which may be out-of-round and of varying diameters. The coupling includes a tubular body formed of elastomeric material having spaced internal deformable inclined lips for contact with the pipe ends. A thin steel shell encircles the tubular body, and this shell has two axially spaced series of slits which encircle the deformable lips. These slit portions of the metal shell may expand radially to accommodate deformation of the elastomeric sealing lips which contact the pipe surfaces, and the portion of the metal shell between the slit portions resists shear loads between the pipe ends. No separate mechanically operated clamps are required. The steel outer shell insures a permanently tight joint and is not subject to the eventual fatigue and compression set which would occur if the entire coupling device were made of elastomeric materials.

FIGURE 5 is a plan view partly broken away showing a metal sheet with parallel slits, used in constructing the metal shell.

FIGURE 6 is a sectional view taken substantially on the lines 6—6 as shown in FIGURE 5.

FIGURE 7 is a view of the metal sheet after the slit portions have been depressed to form continuous channels or grooves.

FIGURE 8 is a sectional view taken substantially on the lines 8—8 as shown in FIGURE 7.

FIGURE 9 is a view of the metal shell formed by rolling of the grooved and slit sheet to form a tube.

Figure 4:
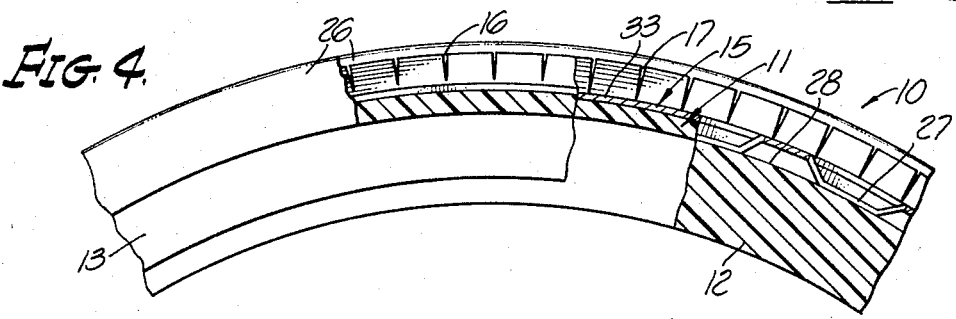
FIGURE 4 is a side elevation of the coupling shown in FIGURE 1, partly in section and partly broken away.

Referring to the drawings, the pipe coupling generally designated 10 includes a tubular body 11 formed of elastomeric materials, for example, polyurethane, and is provided with a central inwardly directed rib 12. On opposite sides of this rib 12 are internal deformable annular inclined sealing lips 13 and 14 formed integrally with the tubular body 11. The tubular body 11 is encircled by a thin metal shell 15 having two axially spaced slit portions 16 and 17 which encircle the ribs 13 and 14, respectively.

The shell 15 is preferably formed of a thin flat strip 19 (FIGURE 5) of stainless steel provided with a first series of parallel slits 20 and a second series of parallel slits 21. The flat steel strip 19 is then shaped by conventional means to form displaced regions 22 and 23 containing the slits 20 and 21, respectively, and also to form offset lugs 27. The grooved strip is then rolled into the circular shape shown in FIGURE 9 to form the shell 15. The overlapping ends 25 of the metal strip are joined together, as by spot welding. The elastomeric body 11 is then placed within the shell 15 with the end flanges 26 on the body protruding therefrom, and with the offset lugs 27 of the body entering groove 28 provided circumferentially on the outer surface of the body 11.

Figure 1:
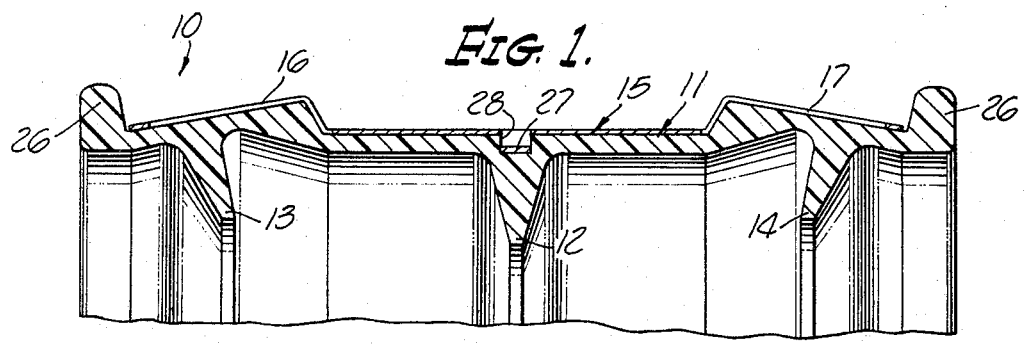
FIGURE 1 is a transverse sectional view showing a pipe coupling comprising a preferred embodiment of this invention, prior to installation on pipe ends.
Figure 2:
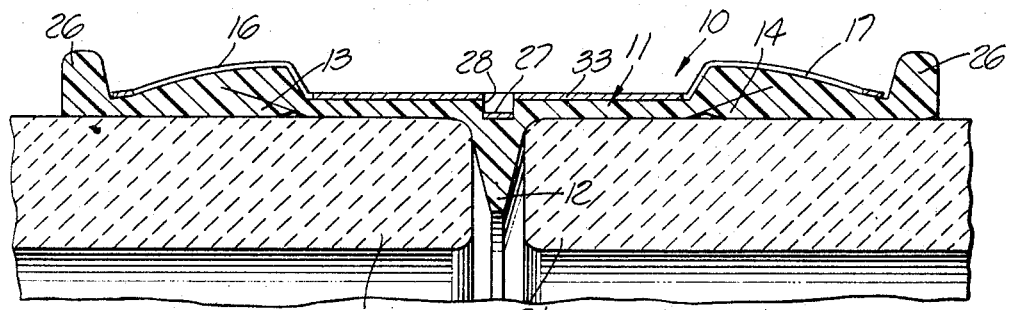
FIGURE 2 is a transverse sectional view showing the pipe coupling installed on pipe ends which are on the high side of the commercial tolerance on diameter.
Figure 3:
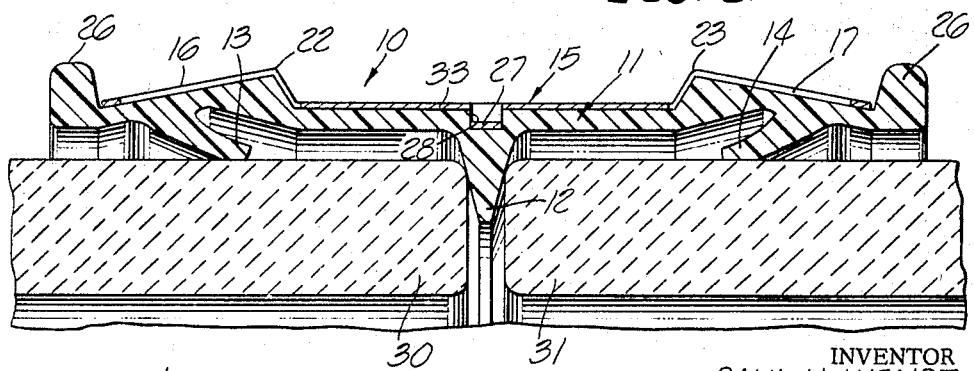
FIGURE 3 is a view similar to FIGURE 2 showing the coupling device installed upon pipe ends which are on the low side of the diameter tolerance.

In use, the end portions 30 and 31 of ceramic pipes are thrust into the interior of the body 11 from opposite ends until they contact the central rib 12. FIGURE 2 shows the distortion of the lips 13 and 14 when the ceramic pipes are on the high side of the outer diameter tolerance. FIGURE 3 shows the distortion of the lips 13 and 14 when the outer diameter of the ceramic pipes 30 and 31 are on the low side of the outer diameter tolerance. The metal of the shell 15 is thin enough so that the shell may change shape to accommodate pipe ends which are out of round. It will be observed in FIGURE 2 that the slit portions 16 and 17 are expanded from the initial unstressed position shown in FIGURE 1 in order to accommodate deformation of the sealing lips 13 and 14. Moreover, the unslit portion 33 of the shell 15 between the slit portions resists shear loads between the pipe ends 30 and 31. The slits 20 and 21 permit the shell 15 to expand radially, but the slits are so narrow as to prevent plastic flow of the elastomeric material through them.

Manually adjustable clamps, of the type used in the prior art, are not required, and yet the pipe ends 30 and 31 may be thrust into the interior of the coupling device 10 without requiring excessive force.

In the form of the invention shown in the drawings, the slit portions 16 and 17 of the metal shell 15 are tapered in cross-sectional outline. While this is the preferred form for maximum accommodation of variation in pipe diameters and out-of-roundness, it has been found that when a lesser degree of accommodation is satisfactory, the shell 15 may be formed directly from the flat strip 19, without the intermediate forming steps to produce the tapered regions 22 and 23. In such case, the slit portions 16 and 17 of the completed coupling, in initial unstressed condition, are initially cylindrical. Upon insertion of the pipe ends into the coupling, these slit portions become convex in order to accommodate deformation of the sealing lips.

Having fully described my invention, it is to be understood that I am not to be limited to the details herein set forth but that my invention is of the full scope of the appended claims.

I claim:

1. A coupling for connecting adjacent ends of aligned pipes, comprising, in combination: a tubular body formed of elastomeric material, said body having axially spaced internal deformable annular sealing lips, each sealing lip being adapted to deform into engagement with the outer surface of one of the pipes, respectively, a metal shell encircling said tubular body and having two axially spaced circumferentially extending slit portions, each slit portion including a series of slits encircling at least one of said deformable sealing lips, whereby the slit portions of the metal shell may expand radially to accommodate deformation of the sealing lips when pipe ends are inserted into the body, and whereby the portion of the metal shell between the slit portions resists shear loads between the pipe ends.

2. The coupling of claim 1 wherein the sealing lips are initially inclined toward each other.

3. A coupling for connecting adjacent ends of aligned pipes, comprising, in combination: a tubular body formed of elastomeric material and provided with a central internal annular rib for abutting engagement with the pipe ends, said body having an internal deformable annular sealing lip spaced on each side of the central rib, each sealing lip being adapted to deform into engagement with the outer surface of one of the pipes, respectively, a metal shell encircling said tubular body and having two axially spaced circumferentially extending slit portions, each slit portion including a series of slits encircling one of said deformable sealing lips, whereby the slit portions of the metal shell may expand radially to accommodate deformation of the sealing lips when pipe ends are inserted into the body, and whereby the portion of the metal shell between the slit portions resists shear loads between the pipe ends.

4. The coupling of claim 3 wherein the sealing lips each taper inward toward the central annular rib.

5. The coupling of claim 3 wherein the slit portions are radially displaced with respect to the portion of the metal shell between the slit portions.

6. The coupling of claim 5 where the slit portions of the metal shell are initially of greater diameter than the portion of the shell between them.

References Cited

UNITED STATES PATENTS

| 1,329,121 | 1/1920 | Hachman | 285—257 |
| 1,358,633 | 11/1920 | Hachman | 285—257 |
| 3,104,898 | 9/1963 | MacDonald et al. | 285—236 |
| 3,233,907 | 2/1966 | Stanton | 285—236 |
| 3,334,928 | 8/1967 | Schmunk | 285—110 |

FOREIGN PATENTS 925,743   3/1955   Germany.

THOMAS F. CALLAGHAN, *Primary Examiner.*

U.S. Cl. X.R.

277—207, 235; 285—230, 235, 383